United States Patent
Saxena et al.

(10) Patent No.: US 7,524,358 B2
(45) Date of Patent: *Apr. 28, 2009

(54) PRODUCTION OF HIGH PURITY AND ULTRA-HIGH PURITY GAS

(75) Inventors: Himanshu Saxena, Columbus, OH (US); Mark William Ackley, East Aurora, NY (US); John Fredric Billingham, Getzville, NY (US); Philip Alexander Barrett, Kenmore, NY (US)

(73) Assignee: Praxair Technology, Inc., Danbury, CT (US)

( * ) Notice: Subject to any disclaimer, the term of this patent is extended or adjusted under 35 U.S.C. 154(b) by 364 days.

This patent is subject to a terminal disclaimer.

(21) Appl. No.: 10/515,307

(22) PCT Filed: May 30, 2003

(86) PCT No.: PCT/US03/17296

§ 371 (c)(1),
(2), (4) Date: May 9, 2006

(87) PCT Pub. No.: WO03/101587

PCT Pub. Date: Dec. 11, 2003

(65) Prior Publication Data

US 2006/0210454 A1    Sep. 21, 2006

Related U.S. Application Data

(60) Provisional application No. 60/385,148, filed on Jun. 3, 2002, provisional application No. 60/384,612, filed on May 31, 2002.

(51) Int. Cl.
*B01D 53/04* (2006.01)
*B01D 53/62* (2006.01)

(52) U.S. Cl. .............................. 95/118; 95/139; 95/140; 96/132; 423/247; 422/190

(58) Field of Classification Search ................ 95/96, 95/117, 118, 129, 139, 140, 143; 96/132; 423/246, 247, 230, 248; 422/171, 177, 190, 422/211
See application file for complete search history.

(56) References Cited

U.S. PATENT DOCUMENTS 3,672,824 A    6/1972    Tamura et al.

(Continued)

FOREIGN PATENT DOCUMENTS

EP    0 454 531 A1    10/1991

(Continued)

OTHER PUBLICATIONS

Salil U. Rege, et al., "Sorbents for air prepurification in air separation" Chemical Engineering Science, 55(2000), 4827-4838.

(Continued)

*Primary Examiner*—Frank M Lawrence
(74) *Attorney, Agent, or Firm*—Iurie A. Schwartz

(57) ABSTRACT

Trace amounts of carbon monoxide and optionally hydrogen are removed from gaseous feed streams by passing the feed stream through a carbon monoxide adsorbent (33) prior to passing it through a supported metal catalyst (34). The invention saves significant capital and operational costs over existing processes.

58 Claims, 5 Drawing Sheets

U.S. PATENT DOCUMENTS

| | | | |
|---|---|---|---|
| 3,789,106 A | 1/1974 | Hay | |
| 4,019,879 A | 4/1977 | Rabo et al. | |
| 4,019,880 A | 4/1977 | Rabo et al. | |
| 4,054,428 A | 10/1977 | Foltz | |
| 4,711,645 A | 12/1987 | Kumar | |
| 4,743,276 A | 5/1988 | Nishida et al. | |
| 4,765,808 A * | 8/1988 | Oigo et al. | 95/140 |
| 4,917,711 A | 4/1990 | Xie et al. | |
| 4,944,273 A | 7/1990 | Baresel et al. | |
| 5,106,399 A | 4/1992 | Fisher | |
| 5,110,569 A | 5/1992 | Jain | |
| 5,202,096 A | 4/1993 | Jain | |
| 5,238,670 A | 8/1993 | Louise et al. | |
| 5,531,809 A | 7/1996 | Golden et al. | |
| 5,587,003 A | 12/1996 | Bulow et al. | |
| 5,656,557 A | 8/1997 | Hata et al. | |
| 5,662,873 A | 9/1997 | Gary | |
| 5,693,302 A | 12/1997 | Gary | |
| 6,027,548 A | 2/2000 | Ackley et al. | |
| 6,048,509 A | 4/2000 | Kawai et al. | |
| 6,074,621 A | 6/2000 | Hsiung et al. | |
| 6,093,379 A | 7/2000 | Golden et al. | |
| 6,511,640 B1 | 1/2003 | Kumar et al. | |
| 6,528,032 B1 * | 3/2003 | Nojima et al. | 423/247 |
| 6,572,681 B1 * | 6/2003 | Golden et al. | 95/122 |
| 2007/0000382 A1 * | 1/2007 | Ackley et al. | 95/90 |

FOREIGN PATENT DOCUMENTS

| | | |
|---|---|---|
| EP | 0 646 543 A1 | 4/1995 |
| EP | 0 835 687 B1 | 4/1998 |
| EP | 1 005 895 A1 | 6/2000 |
| EP | 1 166 845 A1 | 2/2002 |
| EP | 1 166 845 B1 | 3/2005 |
| FR | 2739304 | 4/1997 |

OTHER PUBLICATIONS

R.W. Triebe, et al., "Adsorption of Nitrogen, Carbon Monoxide, Carbon Dioxide and Nitric Oxide on Molecular Sieves", Gas Separation and Purification 9(4), Dec. 1995, p. 223-230(1995).

G.V. Tsitsishvili, et al., "Natural Zeolites", Ellis Horwood Limited, p. 119, 1992.

G.K. Pearce, "The Industrial Practice of Adsorption", Separation of Gases, 5th BOC Priestley Conf. Spec Publ. No. 80, Birmingham, UK Sep. 19-21, 1989, Royal Soc of Chem 1990 Cambridge.

Yun-Yang Huang, "Adsorption in AgX and AgY Zeolites by Carbon Monoxide and Other Simple Molecules", Journal of Catalysis 32, 482-491(1974).

Venet, et al., "Understand the Key Issues For High Purity Nitrogen Production", Chemical Engineering Progress, Jan. 1993.

Youchang Xie, et al., "High Efficient Adsorbent for Separation of Carbon Monoxide", Proc. IVth Int. Conf. on Fundamentals of Adsorption, Kyoto, May 17-22, 1992.

Ravi Jain, et al., "Developments in air prepurification units for cryogenic air separation units", BOC Technology, Jun. 1995, p. 29-32.

* cited by examiner

PRODUCTION OF HIGH PURITY AND ULTRA-HIGH PURITY GAS

PRIORITY

This application claims the benefit of U.S. provisional applications Ser. No. 60/384,612, filed May 31, 2002 and Ser. No. 60/385,148, filed Jun. 3, 2002. The contents of each application are herein incorporated by reference.

FIELD OF THE INVENTION

This invention relates to the removal of impurities from feed air streams and more particularly to the removal of hydrogen ($H_2$) and carbon monoxide (CO) from feed air streams.

BACKGROUND OF THE INVENTION

Carbon monoxide (CO) and hydrogen ($H_2$) can be present in air at concentrations of up to about 50 ppm and 10 ppm respectively, although typical concentrations in air are on the order of 1 ppm CO and 1 ppm $H_2$. Normal cryogenic distillation processes used to produce ultra high purity (UHP) nitrogen ($N_2$) do not remove hydrogen and remove only a small portion of the CO. Unless removed by alternative means, these molecules will contaminate the product nitrogen at a concentration up to about two and a half times their concentration in the feed air. Since the electronic industry demands very high purity nitrogen product (typically having on the order of 5 ppb CO or less and 5 ppb $H_2$ or less), CO and $H_2$ have to be removed from feed air.

Air also contains other contaminants such as water ($H_2O$), carbon dioxide ($CO_2$) and hydrocarbons. In cold sections of the distillation separation process (such as heat exchangers and separation columns), water and $CO_2$ can solidify and block the heat exchangers or other parts in the distillation columns. Acetylene and other hydrocarbons in air also present a potential problem because they can accumulate in the liquid oxygen ($O_2$) and create an explosion hazard. It is therefore desirable to remove these impurities prior to the cryogenic distillation of air.

Air prepurification can be accomplished using pressure swing adsorption (PSA), temperature swing adsorption (TSA) or a combination of both (TSA/PSA) incorporating either a single adsorbent or multiple adsorbents. When more than one adsorbent is used, the adsorbents may be configured as discrete layers, as mixtures, composites or combinations of these. Impurities such as $H_2O$ and $CO_2$ are commonly removed from air using one or more adsorbent layers in a combined TSA/PSA process. A first layer of activated alumina or zeolite is commonly used for water removal and a second layer of zeolite such as 13X molecular sieve is used for $CO_2$ removal. Prior art, such as U.S. Pat. No. 4,711,645, teaches the use of various adsorbents and methods for removal of $CO_2$ and water vapor from air. These adsorbents are ineffective for the removal of CO and $H_2$, thus allowing CO and $H_2$ to pass through to the distillation equipment.

There are three principal strategies in the prior art to remove CO and/or $H_2$ from air to produce UHP nitrogen: removal upstream of the prepurifier adsorber, removal within the prepurifier adsorber using an oxidation catalyst and removal from the nitrogen product after cryogenic air separation.

In the first approach, CO and $H_2$ are usually removed by high temperature catalytic oxidation over a supported noble metal or hopcalite catalyst upstream of the prepurifier beds. The products from oxidizing CO and $H_2$, namely $CO_2$ and $H_2O$, are removed along with the ambient $CO_2$ and $H_2O$ in the prepurifier beds (F. C. Venet, et al., "Understand the Key Issues for High Purity Nitrogen Production," Chem. Eng. Prog., pp 78-85, January 1993). This approach requires significant power and additional capital, adding substantially to the cost of the process.

U.S. Pat. No. 5,656,557 discloses a process wherein the compressed air is further heated to 350° C. prior to entering a catalyst tower containing palladium (Pd) and/or platinum (Pt) supported catalyst for converting CO, $H_2$ and hydrocarbons to $H_2O$ and $CO_2$. The processed air is then cooled to 5° C. to 10° C. prior to entering the prepurifier where the $H_2O$ and $CO_2$ are removed. Part of the effluent from the prepurifier may be used as air containing less than 1 ppm total impurities, while the remaining air is separated cryogenically to produce $N_2$ and $O_2$.

French patent FR 2 739 304 describes a method of removing CO and $H_2$ from air which involves; 1) contacting the compressed hot moist gas from the compressor with a bed of CO oxidation catalyst; 2) cooling the resulting intermediate air stream to ambient temperature; 3) contacting this CO free stream with an adsorbent to adsorb $CO_2$ and $H_2O$; and 4) contacting the resulting stream with a $H_2$ trapping adsorbent. The CO catalyst can be copper (Cu) or a Pt group metal supported on alumina, silica or zeolite. The $H_2$ trapping adsorbent can be osmium (Os), iridium (Ir), Pd, ruthenium (Ru), rhodium (Rh) or Pt supported on alumina, silica or zeolite.

U.S. Pat. No. 6,074,621 describes a similar process as FR 2 739 304 except for the cooling step after the CO oxidation catalyst.

U.S. Pat. No. 5,693,302 discloses a method of removing CO and $H_2$ from a composite gas by passing over particles containing gold and Pd supported by $TiO_2$.

U.S. Pat. No. 5,662,873 describes a similar process using a catalyst consisting of silver and at least one element from Pt family supported on alumina, silica or zeolite.

A second technology employed in the prior art is an ambient temperature process for CO and $H_2$ removal from air.

U.S. Pat. No. 5,110,569 discloses a process for removing CO and optionally hydrogen from air by 1) removing water 2) catalytically oxidizing CO to $CO_2$ and optionally $H_2$ to $H_2O$ and 3) removing the oxidation products. Oxidation catalysts for CO can be a mixture of manganese and copper oxides such as hopcalite or Carulite. Nickel oxide is also stated to be an effective CO catalyst. The oxidation catalyst for $H_2$ is typically supported palladium.

U.S. Pat. No. 5,238,670 discloses a method of removing CO and/or $H_2$ from air at a temperature between 0° C. and 50° C. by 1) removing water from air until it has a water content lower than 150 ppm and 2) removing CO and $H_2$ on a bed of particles containing at least one metallic element selected from Cu, Ru, Rh, Pd, Os, Ir and Pt deposited by ion-exchange or impregnation on zeolite, alumina or silica.

European patent application EP 0 454 531 describes a similar method which suggests removing both $H_2O$ and $CO_2$ prior to the impregnated bed of particles. Traces of $H_2O$ and $CO_2$ are removed downstream of the impregnated particle bed.

U.S. Pat. No. 6,048,509 discloses a method for removing CO and $H_2$ from air at ambient temperature wherein air containing $H_2O$, $CO_2$, CO and optionally $H_2$ passes through following steps; 1) contacting the gas with a CO catalyst consisting of Pd or Pt and at least one member selected from the group consisting of iron (Fe), cobalt (Co), nickel (Ni), manganese (Mn), Cu, chromium (Cr), tin (Sn), lead (Pb), and cerium (Ce) supported on large pore alumina; 2) contacting the CO free gas with an adsorbent for water removal; 3) contacting the resulting gas with a $CO_2$ adsorbent for $CO_2$ removal and optionally; 4) contacting the gas with a $H_2$ catalyst which consists of Pt or Pd supported on activated alumina or zeolite. The water formed in the last step of hydrogen oxidation is either adsorbed on the $H_2$ catalyst support or it is removed by a $H_2O$ adsorbent, which is either physically mixed with the $H_2$ catalyst or placed downstream of it.

U.S. Pat. No. 6,093,379 describes a method where a prepurifier bed with a first layer of water adsorbent and a second layer of $CO_2$ adsorbent operating at ambient temperature is augmented by a third layer of catalyst/adsorbent to remove both CO and $H_2$. The third layer is exposed to substantially $H_2O$-free and $CO_2$-free air at ambient temperature. The dual catalyst/adsorbent is placed in the third layer in the most downstream end of the prepurifier beds. The dual catalyst/adsorbent layer oxidizes CO, adsorbs the resulting $CO_2$, and chemisorbs $H_2$. This dual catalyst/adsorbent is a precious metal such as Pd on a support having a zero point charge (ZPC) of greater than 8.

U.S. Pat. No. 6,511,640 discloses a method wherein a prepurifier is configured to contain various materials layered in series beginning with an adsorbent at the feed inlet for $H_2O$ removal. The second layer, an oxidation catalyst to convert CO to $CO_2$, is followed by an adsorbent for $CO_2$ removal. An oxidation catalyst is placed in the next layer to convert $H_2$ to $H_2O$, while the final layer is used for adsorbing $H_2O$. The CO catalyst disclosed is hopcalite, while the $H_2$ catalyst is Pd supported on activated alumina.

A third common strategy for producing UHP $N_2$ in the prior art is the treatment of the cryogenically separated $N_2$ product to remove $H_2$, CO, $O_2$ and other contaminants penetrating the prepurifier and air separation unit.

U.S. Pat. No. 4,579,723 discloses the use of a Ni or Cu supported catalyst or getter to oxidize the contaminants to $CO_2$ and $H_2O$, which are subsequently removed in an adsorber.

European patent EP 0 835 687 teaches regeneration of catalyst beds with a high temperature $N_2$ purge.

Adsorption of CO has been applied in the prior art predominantly for recovery of CO in bulk separations, e.g. in cases where the concentration (partial pressure) of CO is relatively high (typically≈1%) and where CO is the more strongly adsorbed component in the gas mixture. Cuprous compounds, either in cationic form in zeolites or dispersed on a porous support, have been widely applied in the recovery of CO from gas mixtures containing CO and $N_2$, methane ($CH_4$), $H_2$ and/or $CO_2$. Materials containing copper in the single oxidation state (denoted as $Cu^+$, Cu(I) or cuprous) display high CO adsorption capacity, while adsorbents containing Cu(II) do not. Adsorbents are commonly synthesized, treated or modified with a Cu(II) compound and then subsequently exposed to a reducing agent such as $H_2$ at elevated temperature to convert the Cu(II) to Cu(I).

Xie et al. ("Highly Efficient Adsorbent for Separation of Carbon Monoxide," Fundamentals of Adsorption, Proc. IVth Int. Conf. On Fundamentals of Adsorption, Kyoto, May 17-22, 1992, pp. 737-741) describes an adsorbent formed by dispersing CuCl on a zeolite support by mixing the dry powders at elevated temperature. High purity CO separated to high recovery is demonstrated for feed streams containing 9.0% CO/91% $N_2$ and 30.7% CO/65.3% $H_2$/4% $CH_4$.

U.S. Pat. No. 4,917,711 discloses adsorbents and processes utilizing supported CuCl. U.S. Pat. No. 5,531,809 discloses VSA processes using CuCl dispersed on alumina for recovery of CO from synthesis gas exiting a steam-methane reformer.

G. K. Pearce ("The Industrial Practice of Adsorption," in: Separation of Gases, 5th BOC Priestley Conf., Birmingham, UK Sep. 19-21, 1989, Spec. Publ. No. 80, Royal Soc. Of Chemistry, Cambridge, 1990) provides a description on the use of Cu(I)Y zeolite for the recovery of CO from $CO/N_2$ and $CO/H_2$ feed streams containing percentage (%) levels of CO.

U.S. Pat. No. 4,473,276 discloses Cu(I)Y and Cu-Mordenite along with other exchanged zeolites having a silica to alumina ratio ($SiO_2/Al_2O_3$)=10 for the recovery of CO.

U.S. Pat. No. 4,019,879 discloses recovery of CO from streams containing $H_2O$ and/or $CO_2$ using $Cu^+$ containing zeolites with 20=$SiO_2/Al_2O_3$=200, e.g. ZSM-5, -8, -11, etc.

Another class of adsorbents having potential for CO adsorption is one in which the materials contain silver ($Ag^+$). Y. Huang ("Adsorption in AgX and AgY Zeolites by Carbon Monoxide and Other Simple Molecules," J. Catal., 32, pp. 482-491, 1974) provides CO and $N_2$ isotherms for AgX and AgY zeolites to partial pressures only as low as 0.1 to 1.0 torr for the lowest temperature (0° C. and 25° C.) isotherms. The adsorption capacity for CO is significantly greater than that of $N_2$ at 25° C. and 100 torr.

U.S. Pat. No. 4,743,276 discloses mordenite, A, Y and X type zeolites exchanged with various amounts of Ag for the bulk separation (recovery) of CO from refinery and petrochemical off-gases.

U.S. Pat. No. 4,019,880 relates to the recovery of CO from gas streams containing also $H_2O$ and/or $CO_2$ using Ag exchanged zeolites with 20=$SiO_2/Al_2O_3$=200, e.g. ZSM-5, -8, -11, etc. The invention applies to feed streams containing at least 10 ppm CO at temperatures 0° C.-300° C. The claimed process results in a CO-depleted effluent, e.g. air.

U.S. Pat. No. 4,944,273 discloses zeolites with 1=Si/Al=100 and doped with Ca, Co, Ni, Fe, Cu, Ag, Pt or Ru for adsorption of oxides of nitrogen ($NO_x$) and CO as part of $NO_x$ and CO sensors, particularly in exhaust gases of automotive vehicles.

U.S. Pat. No. 3,789,106 discloses that mordenite charged with copper is effective in removing CO from $H_2$ at CO partial pressure below 3 mmHg. The effectiveness was determined by subjecting the adsorbent to CO concentrations greater than or equal to 100 ppm and measuring capacity at saturation.

The above prior art relating to adsorption of CO is almost totally silent with respect to purification of CO from mixed gas streams, particularly those containing less than 10 ppm CO in $O_2$ and $N_2$.

OBJECTS OF THE INVENTION

It is therefore an object of the invention to provide an improved method for the removal of trace amounts of CO and at least one of $H_2$, $H_2O$, $CO_2$, hydrocarbons and $N_2O$ from feed gas streams, preferably air.

SUMMARY OF THE INVENTION

The invention relates to the removal of CO and optionally $H_2$ from air and/or other gases or gas mixtures using a combination of adsorptive separation and catalytic conversion, and provides unexpected savings in capital and power costs over existing technologies.

In one preferred embodiment, at least 90% of each of $CO_2$ and $H_2O$ are first removed from the feed gas (preferably air) to produce a $CO_2$ and $H_2O$ depleted gas. In a particularly preferred embodiment, the $CO_2$ and $H_2O$ depleted gas contains less than 1.0 ppm (more preferably less than 0.25 ppm) $CO_2$ and less than 1.0 ppm (more preferably less than 0.10 ppm) $H_2O$. A substantial amount of CO is then removed from the $CO_2$ and $H_2O$ depleted gas through the use of a CO adsorbent to produce a CO depleted gas containing, in a preferred embodiment, less than 100 ppb CO, more preferably less than 5 ppb CO. Optionally $H_2$ and any remaining CO may then be removed using a catalyst. Because of this unique combination of catalysis and adsorption, the process of the present invention provides surprisingly superior CO and $H_2$ removal efficiency over the prior art processes.

A preferred apparatus for the practice of the invention comprises an adsorption apparatus for the removal of CO from a feed stream containing CO in an amount of less than 50 ppm. The apparatus comprises at least one adsorption vessel containing a CO adsorbent layer, the CO adsorbent having a $\Delta CO$ working capacity greater than or equal to 0.01 mmol/g; and wherein a) when the feed stream further contains at least one gas selected from the group consisting of nitrogen, He, Ne, Ar, Xe, Kr, $CH_4$ and mixtures thereof, the adsorbent is ion exchanged with a Group IB element, and is preferably selected from the group consisting of AgX zeolite, Ag-Mordenite, Cu-clinoptilolite, AgA zeolite and AgY zeolite, and b) when the feed stream further contains at least one gas selected from the group consisting of oxygen and air and mixtures thereof, the apparatus is preferably an air prepurifier, and the adsorbent is a zeolite having a $SiO_2/Al_2O_3$ ratio of <20, and is ion-exchanged with a $Ag^+$ or $Au^+$, and is preferably selected from the group consisting of AgX zeolite, Ag-Mordenite, AgA zeolite and AgY zeolite.

In a further embodiment the apparatus contains two or more adsorption vessels that are selected from the group consisting of vertical flow vessels, horizontal flow vessels, lateral flow vessels or radial flow vessels.

In a further embodiment the adsorption apparatus further contain an adsorbent, preferably one or more of alumina or NaX zeolite, selective for the adsorption of water that is upstream of said CO adsorbent layer.

In a further embodiment the apparatus further contains a catalyst layer, preferably a metal supported catalyst comprising one or more of the metals Os, Ir, Pt, Ru, Rh, Pd, Fe, Co, Ni, Cu, Ag, Au, Zn, Sn, Mn, Cr, Pb, Ce supported on a substrate selected from the group consisting of alumina, silica, natural or synthetic zeolites, titanium dioxide, magnesium oxide and calcium oxide, for the catalytic oxidation of $H_2$ to $H_2O$ that is downstream of said CO adsorbent layer.

In a further embodiment the apparatus further contains an auxiliary adsorbent, preferably one or more of alumina or NaX, for the removal of water that is downstream of said catalyst layer.

In a further embodiment the $\Delta CO$ working capacity is greater than or equal to 0.03 mmol/g.

In a further embodiment, the apparatus further contains one or more additional adsorbents for the adsorption of one or more of $H_2O$, $CO_2$, $N_2O$ and hydrocarbons, wherein the additional adsorbents preferably are selected from the group consisting of alumina, silica gel, clinoptilolite, zeolites, composites thereof and mixtures thereof, and are located downstream of the catalyst layer.

In a further embodiment the CO adsorbent has a $\Delta CO/\Delta N_2$ separation factor of greater than or equal to $1\times 10^{-3}$.

In a further embodiment the CO adsorbent is AgX having at least 50%, preferably 100% of its cations associated with Ag.

A preferred process for the practice of the invention comprises a process for the removal of CO from a feed stream containing CO in an amount of less than 50 ppm, or even less than 1.0 ppm or 0.5 ppm. The process, which is preferably an air prepurification process, comprises contacting the feed stream with a CO adsorbent having a $\Delta CO$ working capacity greater than or equal to 0.01 mmol/g, preferably greater than or equal to 0.03 mmol/g, to produce a CO depleted gas stream, that may be recovered; and wherein a) when the feed stream further contains at least one gas selected from the group consisting of nitrogen, He, Ne, Ar, Xe, Kr, $H_2$, $CH_4$ and mixtures thereof, the adsorbent is a zeolite exchanged with a Group IB element and is preferably selected from the group consisting of AgX zeolite, Ag-Mordenite, Cu-clinoptilolite, AgA zeolite and AgY zeolite, and b) when the feed stream further contains at least one gas selected from the group consisting of oxygen and air and mixtures thereof, the adsorbent is a zeolite having a $SiO_2/Al_2O_3$ ratio of <20, and is ion-exchanged with a $Ag^+$ or $Au^+$, and is preferably selected from the group consisting of AgX zeolite, Ag-Mordenite, AgA zeolite and AgY zeolite.

In a further embodiment, the process comprises recovering the CO depleted gas stream, wherein CO is present in the CO depleted gas stream at a concentration of less than 100 ppb, preferably less than 5 ppb, most preferably less than 1 ppb.

In a further embodiment, said feed gas further comprises water ($H_2O$), and the process further comprises contacting the feed stream with a water selective adsorbent, preferably alumina or NaX, that is located upstream of said CO adsorbent.

In a further embodiment, the feed gas further comprises hydrogen, and the process further comprises contacting the CO depleted feed stream with a catalyst layer that is preferably a metal supported catalyst comprising one or more of the metals Os, Ir, Pt, Ru, Rh, Pd, Fe, Co, Ni, Cu, Ag, Au, Zn, Sn, Mn, Cr, Pb, Ce supported on a substrate selected from the group consisting of alumina, silica, natural or synthetic zeolites, titanium dioxide, magnesium oxide and calcium oxide, for the catalytic oxidation of $H_2$ to $H_2O$ to produce a $H_2$ depleted and $H_2O$ enriched gas, and wherein the catalyst layer is located downstream of said CO adsorbent layer. The hydrogen depleted gas preferably contains less than 100 ppb hydrogen, and more preferably less than 5 ppb hydrogen.

In another embodiment, the process further comprises the step of contacting the catalytically produced $H_2O$ enriched gas with an adsorbent for the removal of water (preferably alumina or NaX) that is located downstream of said catalyst layer to produce a gas that is depleted in CO, $H_2$ and $H_2O$.

In another embodiment the CO adsorbent has a$\Delta CO/\Delta N_2$ separation factor that is greater than or equal to $1\times 10^{-3}$, preferably greater than or equal to $1\times 10^{-2}$.

In another embodiment, the process further comprises passing said feed gas over a) at least one adsorbent layer upstream of said CO adsorbent for the adsorption of one or more of $H_2O$ and $CO_2$, b) a catalyst layer for the catalytic conversion of $H_2$ to $H_2O$ that is downstream of said CO adsorbent layer; and c) one or more additional adsorbents, preferably selected from the group consisting of alumina, silica gel, clinoptilolite, zeolites, composites thereof and mixtures thereof, for the adsorption of one or more of $H_2O$, $CO_2$, $N_2O$ and hydrocarbons, wherein said additional adsorbents are downstream of said catalyst layer.

In an alternative embodiment, the process is selected from the group consisting of pressure swing adsorption, temperature swing adsorption, or a combination thereof, and the process takes place in an adsorber vessel selected from a vertical flow vessel, a horizontal flow vessel or a radial flow vessel.

In a preferred embodiment the adsorption step of the process is operated at a temperature of zero to fifty degrees Celsius.

In a preferred process the CO adsorbent is AgX having at least 50%, more preferably 100% of its cations associated with Ag.

In a preferred embodiment the feed stream contains air, and the CO depleted gas stream is passed to a cryogenic distillation column.

In an alternative embodiment the CO partial pressure in the feed stream is less than 0.1 mmHg, or even less than 0.005 mmHg.

An alternative embodiment relates to a process for the removal for the removal of CO from a feed stream containing CO in an amount of less than 50 ppm and hydrogen, the process comprising contacting the feed stream with a CO adsorbent having a ΔCO working capacity greater than or equal to 0.01 mmol/g to produce a CO depleted gas stream; and wherein the adsorbent is a zeolite exchanged with a Group IB element.

In a preferred embodiment, the invention comprises an adsorption apparatus for the removal of CO from a feed stream containing CO in an amount of less than 50 ppm, and hydrogen, the apparatus comprising at least one adsorption vessel containing a CO adsorbent layer having a ΔCO working capacity greater than or equal to 0.01 mmol/g; and wherein said adsorbent is a zeolite exchanged with a Group IB element.

In a particularly preferred embodiment, the invention comprises an air prepurification adsorption apparatus for the removal of CO from an air feed stream containing CO in an amount of less than 50 ppm, the apparatus comprising at least one adsorption vessel containing a CO adsorbent layer having a ΔCO working capacity greater than or equal to 0.01 mmol/g; and wherein the adsorbent is a zeolite (preferably AgX), having a $SiO_2/Al_2O_3$ ratio of <20, and is ion-exchanged with a $Ag^+$ or $Au^+$.

In a preferred embodiment, the air prepurification apparatus further comprises at least one adsorbent layer upstream of said CO adsorbent for the adsorption of one or more of $H_2O$ and $CO_2$.

In a preferred embodiment, the prepurification apparatus further comprises a catalyst layer for the catalytic conversion of $H_2$ to $H_2O$ that is downstream of the CO adsorbent layer; and one or more additional adsorbents for the adsorption of one or more of $H_2O$, $CO_2$, $N_2O$ and hydrocarbons, wherein said additional adsorbents are downstream of said catalyst layer.

In an alternative embodiment, the invention comprises a process for the removal of CO from a feed stream containing CO in an amount of less than 50 ppm and air said process comprising contacting said feed stream in an adsorber vessel with a CO adsorbent having a ΔCO working capacity greater than or equal to 0.01 mmol/g to produce a CO depleted gas stream; and wherein the adsorbent is a zeolite having a $SiO_2/Al_2O_3$ ratio of <20, and is ion-exchanged with a $Ag^+$ or $Au^+$, preferably AgX. This process may further comprise a) passing the feed stream over at least one adsorbent layer upstream of said CO adsorbent for the adsorption of one or more of $H_2O$ and $CO_2$ to produce a $H_2O$ and or $CO_2$ depleted feed stream b) passing the feed stream over a catalyst layer that is downstream of said CO adsorbent layer for the catalytic conversion of $H_2$ to $H_2O$ layer and one or more additional adsorbents for the adsorption of one or more of $H_2O$, $CO_2$, $N_2O$ and hydrocarbons, wherein said additional adsorbents are downstream of said catalyst layer to produce a feed stream that is depleted in CO, $H_2$ and one or more of $H_2O$, $CO_2$, $N_2O$ and hydrocarbons, and, optionally, passing the depleted feed stream to a cryogenic distillation column for the separation of air.

Combinations of any of the above embodiments are contemplated to be within the scope of the invention.

BRIEF DESCRIPTION OF THE DRAWING

Other objects, features and advantages will occur to those skilled in the art from the following description of preferred embodiment(s) and the accompanying drawings, in which.

DETAILED DESCRIPTION OF THE INVENTION

Figure 1:
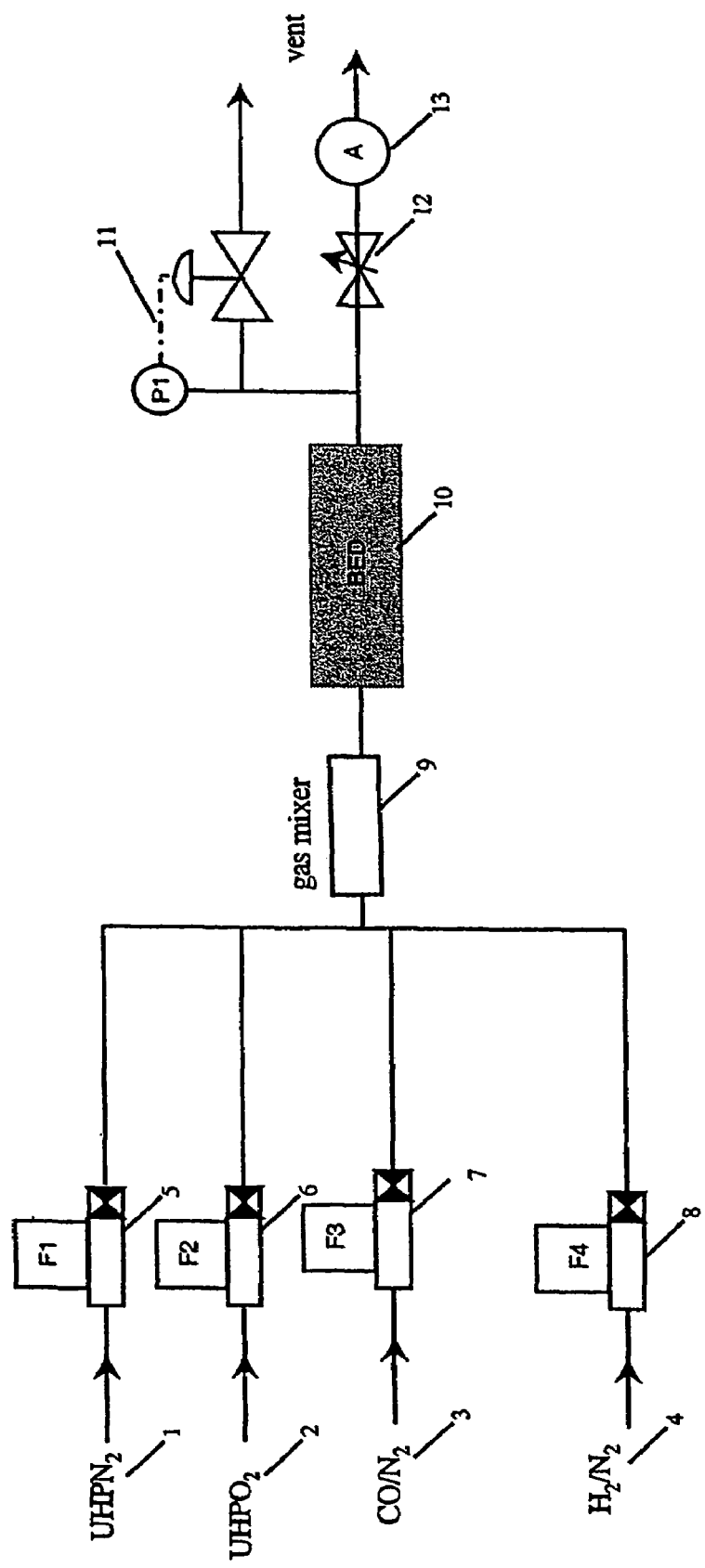
FIG. 1 is a schematic diagram of a breakthrough test apparatus.

The invention relates to the removal of CO and optionally $H_2$ from a feed gas containing ppm levels of CO and ppm levels of $H_2$. The invention is particularly applicable to removing CO from feed gas streams having 1 ppm or less CO therein; in particular, feed gas streams having CO partial pressures of less than 0.1 mmHg or even as low as 0.005 mmHg or lower.

The feed gas is typically air, and may also contain other contaminants including at least one of $CO_2$, $H_2O$, $N_2O$ and hydrocarbons such as acetylene. The removal of these components typically takes place in a prepurification process prior to air separation by cryogenic means, though the invention may also be applied to remove CO and, optionally hydrogen impurities after cryogenic distillation of air.

The invention may be practiced with feed gas streams containing as much as 50 ppm CO and 10 ppm $H_2$ in the feed, though feed gas streams containing less than 1 ppm or even less than 0.5 ppm CO and 1 ppm or even less than 0.5 ppm $H_2$ may also be used. Practice of the invention with such feed streams can produce a product gas stream containing less than 5 ppb CO and less than 5 ppb $H_2$, though gas streams containing 1 ppb CO and 1 ppb $H_2$ can also be achieved.

The use of a CO adsorbent followed by a $H_2$ catalyst in accordance with a preferred embodiment of the invention reduces the $H_2$ catalyst requirement, eliminates the need for high temperature activation, maximally protects the $H_2$ catalyst from poisoning by locating it at the clean end of the adsorber and reduces capital and operation costs as compared to existing prepurification techniques. The result is that the effluent from the inventive adsorber/adsorption process (e.g. the feed to a cryogenic distillation column (or "cold box") of an air separation unit (ASU)) contains less than 5 parts per billion (ppb) CO and less than 5 ppb $H_2$.

In one preferred embodiment of the invention, an adsorbent bed is configured to first remove from a feed stream containing CO, $H_2$, $CO_2$ and $H_2O$ impurities, substantially all of the $H_2O$ and optionally all of the $CO_2$ prior to removing CO on a CO adsorbent. The $CO_2$, $H_2O$ and CO depleted gas is then passed through a catalyst bed to remove any remaining CO and the $H_2$. The thus purified gas is then passed to an ASU to produce UHP nitrogen. For the purpose of this disclosure, a "high purity" gas means a gas having individual contaminant levels of less than about 100 ppb (parts per billion) and an "ultra high purity" (UHP) gas means a gas having individual contaminant levels less than about 10 ppb, preferably less than about 5 ppb and most preferably less than 1 ppb, depending upon the intended application of the gas.

Thus the present invention produces a gas depleted of $H_2$ and CO in a two step process:

1) Removal of CO by adsorption from a feed stream containing trace amounts of CO at temperatures in the range of 0 to 50 degrees Celsius (C.) on a suitable adsorbent in the presence of high $N_2$ and/or $O_2$ concentrations to produce an effluent gas containing less than 5 ppb CO; and 2) optional removal of trace amounts of $H_2$ from a feed stream in the presence of high $N_2$ and/or $O_2$ concentrations by a combination of adsorption and/or absorption and/or catalysis at temperatures in the range of 0 to 50 degrees C. to produce an effluent gas containing less than 5 ppb $H_2$.

In accordance with one embodiment of the invention, an appropriate CO adsorbent is selected that has sufficient $\Delta CO$ working capacity to remove most or all of the CO from the feed stream. An ideal CO adsorbent would have good CO loading ($\Delta CO$ or working capacity) in the presence of high $N_2$ and/or $O_2$ concentrations. It is also desirable to have low $N_2$ loading to maximize CO selectivity and to minimize the cooling effect of $N_2$ desorption during depressurization. In a preferred embodiment the adsorbent also has a high $\Delta CO/\Delta N_2$ working separation factor at the local stream conditions.

One method for estimating adsorbent performance is by determining the working capacity of each of the primary adsorbates, i.e. $N_2$ and CO. This is the methodology applied in the present invention. The separation factor $\alpha$, as defined below, is a preferred way to evaluate the adsorbent effectiveness. This methodology is discussed in detail in U.S. Pat. No. 6,152,991, the contents of which are herein incorporated by reference.

Separation factor $\alpha$ is defined as follows:

$$\alpha = \frac{\Delta CO}{\Delta N_2} = \frac{w_{CO}(y,p,T)_{ads} - w_{CO}(y,p,T)_{des}}{w_{N_2}(y,p,T)_{ads} - w_{N_2}(y,p,T)_{des}} \quad (1)$$

where separation factor $\alpha$ is defined as the ratio of the working capacities. The numerator in this equation is the working capacity of CO, which is equal to the difference in loading w between adsorption and desorption conditions. The adsorption and desorption conditions are characterized by composition y, pressure p and temperature T. In TSA air prepurification, maximum regeneration temperatures may vary from about 100° C. to about 350° C. As a result, it is expected that the adsorbates (particularly atmospheric gases) will be completely thermally desorbed from the adsorbents. Under such conditions, Equation (1) can be simplified as follows:

$$\alpha = \frac{\Delta CO}{\Delta N_2} = \frac{w_{CO}(y,p,T)_{ads}}{w_{N_2}(y,p,T)_{ads}} \quad (2)$$

When a contaminant is removed in a shallow adsorbent layer in a TSA process and significant resistance to mass transfer exists, the selectivity is redefined according to Equation (3):

$$\frac{\Delta X_{CO}}{\Delta X_{N_2}} = \frac{\frac{m_{in}}{w_s} \int_0^{t_b}(y_{in} - y_{out})dt}{X_{N_2}(y,P,T)_{ADS}} \quad (3)$$

The numerator in Equation (3) represents the working capacity of the adsorbent for the contaminant. $m_{in}$ represents the molar feed flow into the bed, $y_{in}$ and $y_{out}$ are the inlet and outlet mole fractions of the minor component, respectively. $w_s$ is the mass of adsorbent and $t_b$ is the breakthrough time corresponding to a predetermined concentration. The denominator is the equilibrium capacity of the major component at the conditions at the end of the adsorption step, i.e. assuming complete desorption of all components. Application of Equation (3) is preferred when the length of the mass transfer zone is an appreciable fraction (e.g. more than about 10%) of the overall depth of the adsorbent layer.

This method is preferred over other methods because the working capacities are determined at the partial pressure of each individual component at the relevant process conditions, e.g. in the case of prepurification the CO and $N_2$ partial pressures in the feed air are typically <0.1 mmHg and >1000 mmHg, respectively. Coadsorption effects are also incorporated into the determination of the loading. Since in air prepurification the feed concentration of $N_2O$ is overwhelming compared to CO, the coadsorption effect of CO upon $N_2$ is negligible. Thus, the denominator of Equation (2) and Equation (3) may be obtained directly from the measured pure-component $N_2$ isotherm.

Conversely, the coadsorption of $N_2$ would have a very significant effect upon the adsorption of CO. If accurate low concentration pure-component isotherm data for CO is available or attainable, then Equation (2) may be applied to assess equilibrium working capacity and selectivity. However, it is preferred to determine the working capacity for CO directly under $N_2$ coadsorption conditions and with mass transfer effects included. This may be done using a breakthrough test method, which is well known to those skilled in the art. Breakthrough tests provide the equilibrium capacity of a component at saturation, and the breakthrough capacity and time at some defined breakthrough level, e.g. 100 ppb. Thus, the $\Delta CO$ working capacity and selectivity are preferably determined using the terms of Equation (3). Since the coadsorption of nitrogen is incorporated into the $\Delta CO$ working capacity, $\Delta CO$ determined by the breakthrough method (numerator of Equation (3)) is the dominant factor in selecting an appropriate Co adsorbent for the purpose of the invention.

One skilled in the art will appreciate that adsorbents satisfying the criteria for acceptable working characteristics for CO relative to $N_2$ will perform even more favorably in other gas mixtures where the bulk component adsorbs less strongly than $N_2$. Examples of such CO-containing gas mixtures include those with one or more of He, $H_2$, Ar, Ne, Xe, Kr, $O_2$ and $CH_4$, and the invention may also be applied to the separation of CO from these gases or gas mixtures.

In order to evaluate the potential effectiveness of CO adsorbents at conditions typical of air separation processes, CO and/or $H_2$ breakthrough tests were performed.

Breakthrough tests were performed at 7.9 bara (114.7 psia), either 10° C. or 27° C. and an inlet gas flowrate of approximately 21 slpm (78.7 mol/m² s) using an adsorption column length of 5.9 cm or 22.9 cm. Variations to these conditions are noted in the examples. The feed conditions are representative of conditions at the inlet of an air prepurifier for a typical cryogenic air separation plant. Complete breakthrough curves were generated for CO and/or $H_2$ in some of the tests, while only partial breakthroughs were determined in those cases using high capacity materials. Initial breakthrough was established at 100 ppb CO and 20 ppb $H_2$. Initial breakthrough and/or saturation loading (capacity in mmol/g) were then determined according to the mass balances as indicated in the numerator of Equation (3). CO and $H_2$ loading determined at the initial breakthrough represent a dynamic or working capacity—incorporating both coadsorption and mass transfer effects.

Breakthrough tests were conducted in the following manner using an apparatus for which the key elements are shown in the schematic of FIG. 1. Challenge gases from cylinders (3,4) containing a mixture of the contaminant gas in $N_2$ were metered through flow controllers (7,8) (at flow rates on the order of 0-5 standard liters per minute (slpm)) where they were mixed in a gas mixer (9) with high purity diluents $N_2$ or helium (He). In some cases the diluent was synthetic air wherein $O_2$ from source 2 was combined with $N_2$ from source 1. This diluent was provided at a prescribed flowrate (e.g. 0-30 slpm) through flow controllers (5,6) to achieve the desired feed concentration of contaminant(s). This mixed challenge gas was then fed through a heat exchange loop and to the test bed 10 containing the adsorbent. Both the test bed 10 and heat exchange loop were located within a thermal bath (not shown), the temperature of which was controlled via a water chiller and thermocouples. Temperature control systems are well known in the art and typically consist of a heat exchange loop, thermal bath, water chiller and thermocouples. Any number of variations of the temperature control system can be effectively applied to maintain the test bed at a constant temperature as would be readily familiar to one of ordinary skill in the art.

The gas pressure during the test was controlled through a control valve/pressure controller 11. A portion of the effluent was passed through valve 12 to one or more analyzers 13 to monitor the breakthrough concentrations of CO and/or $H_2$ as a function of time. A Servomex 4100 Gas Purity Analyzer equipped with both CO and $CO_2$ sensors was used in Example 1. In Examples 2-4 a Trace Analytical (RGA5) Analyzer was used for trace CO and $H_2$ measurement.

All zeolites were obtained from commercial sources (identified below), but some were further modified by the inventors by ion exchange. Mordenite and Type Y zeolites were extrudates, Type X and Type A zeolites were beads and clinoptilolite and chabazite were granular for the examples of this invention.

A laboratory ion-exchange column was used to create highly exchanged zeolites. In the column procedure, the zeolite was packed inside the column and ion exchange solution was pumped upwards through the bed at a flow rate of 0.5 ml/minute. The column was heated between 70-90° C. to promote exchange. At least a ten-fold excess of solution was used to ensure that high levels of ion exchange are obtained. The product was collected by filtration and washed thoroughly with deionized water.

Powder X-ray diffraction and inductively coupled plasma (ICP) chemical analysis were used to verify the integrity of the samples as well as determine the level of ion exchange. For the Ag, Cu and zinc (Zn) samples, a 0.1 molar (M) solution of the respective nitrate salt was used. For sodium (Na) exchange, a 1.0M sodium chloride salt solution was used. The zeolites were typically in their Na exchanged forms prior to exchange with Ag, Cu or Zn. For clinoptilolite, a TSM-140 sample was selected and exchanged first with Na before Ag, Cu or Zn was introduced. Zeolites 13X HP, 13X APG and Na mordenite were obtained from UOP and zeolite 4A was purchased from Aldrich.

For lower exchange levels of Ag on 13X HP (e.g. <85%), a batch procedure was used. In the batch process the zeolite was immersed in a fixed volume of solution as opposed to having fresh solution pumped into a column on a regular basis. Silver nitrate solution having a concentration of 0.025-0.1M was used.

The zeolites were stirred in a solution of silver nitrate at 50-90° C. The solution strength was chosen to reflect the level of exchange desired. After a period of 6-8 hours stirring at temperature, the solution was either refreshed up to a total of three times, or the sample was collected by filtration and washed thoroughly with deionised water. Refreshing the solution increased the exchange level. Powder X-ray diffraction and ICP chemical analyses were performed to examine the crystallinity and ion exchange level of the product samples.

Methods for ion exchange of zeolites are well known to those of ordinary skill in the art. The column and batch methods described above are in no way limiting to the invention. Different procedures may be used in order to achieve desired exchange levels for the cations and zeolites in accordance with the present invention.

The invention will now be described with reference to the following comparative examples. These examples are not intended to limit the scope of the invention in any way.

EXAMPLE 1

Outside the Scope of the Invention

The natural adsorbents (clinoptilolite and chabazite) were obtained from Steelhead Specialty Minerals, WA. Synthetic zeolites were obtained from various manufacturers: Zeolyst (HZSM5), Zeochem (CaX) and UOP (13X, LiX, 5AMG). All of the adsorbents were thermally activated at 350° C., 1.0 bara pressure and under $N_2$ purge for approximately 16 hours before each test. After regeneration the adsorbents were allowed to cool to 27° C. This group of adsorbents presents a cross section of adsorbent characteristics known to effect adsorption properties, e.g. Si/Al, micropore channel opening size, zeolite structure type, number and type of cations, etc. Breakthrough tests were performed at the conditions described above to saturation using 1.0 ppm CO in $N_2$ or He. Breakthrough time was determined at 100 ppb CO. The results are summarized in Table I.

TABLE I

| Adsorbent | Flow slpm | T ?C. | Carrier[1] | $y_{co}$ ppm | Bed cm | $t_b$[2] min | $X_{co}$[3] mmol/g |
|---|---|---|---|---|---|---|---|
| Clinoptilolite | 20.4 | 27 | $N_2$ | 1.0 | 22.9 | <2 | $1.4 \times 10^{-5}$ |
| TSM-140 | 21 | 27 | He | 1.0 | 22.9 | 30 | $1.2 \times 10^{-3}$ |
| Chabazite | 21 | 27 | $N_2$ | 1.0 | 22.9 | <2 | $2.2 \times 10^{-5}$ |
| TSM-300 | 21 | 27 | He | 1.0 | 22.9 | 114 | $4.5 \times 10^{-3}$ |
| LiX ($SiO_2$/$Al_2O_3$ = 2.0) | 21 | 27 | $N_2$ | 1.0 | 22.9 | <2 | $2.5 \times 10^{-5}$ |
| 5A MG | 5.5 | 10 | $N_2$ | 1.0 | 22.9 | <6 | $3.1 \times 10^{-5}$ |
| CaX (Z100) | 5.5 | 10 | $N_2$ | 1.0 | 22.9 | <4 | $3.9 \times 10^{-5}$ |
| HZSM5 (CBV3024E) | 21 | 27 | air | 2.0 | 5.9 | <2 | — |

[1]typical $H_2$ concentrations in carrier gases .0.25 ppm
[2]breakthrough determined at $y_{co}$ = 100 ppb
[3]equilibrium saturation capacity of CO The competitive effect of $N_2$ upon CO saturation capacity ($X_{CO}$) is evident in that $X_{CO}$ for CO/$N_2$ feed was reduced by a factor of 100 or more compared to that for CO/He feed for the small pore natural zeolites. Breakthrough times of CO in $N_2$ were reduced by factors of 15 to more than 50 compared to CO in He. The high partial pressure of $N_2$ relative to that of CO is a critical factor in determining adsorbent effectiveness in CO removal. All of the adsorbents in Table I have CO/$N_2$ breakthrough times of only a few minutes. Although breakthrough time can be extended with longer adsorbent beds, none of these adsorbents is likely to provide a practical solution for air prepurifiers with adsorption cycle times of one hour or more.

$N_2$ isotherms were measured at 27° C. using well known gravimetric balance methods for chabazite and clinoptilolite. The $N_2$ capacity from the isotherms and the CO saturation capacity from Table I were combined in Equation 2 to result in equilibrium separation factors for the adsorbents in Table I ($\Delta CO/\Delta N_2$)<$2\times10^{-5}$.

EXAMPLE 2

Several zeolites containing exchanged Ag, Cu and Zn cations were tested as described above to evaluate the working CO capacity. AgX (P/N 38,228-0) was obtained from Aldrich, while clinoptilolite (TSM-140) and mordenite (large-pore from UOP) were exchanged in small-scale laboratory columns. The extent of exchange was determined by inductively coupled plasma (ICP) analysis. Exchanged samples were air-dried and then activated overnight in a dry $N_2$ purge at 350° C. Breakthrough tests were conducted using a 5.9 cm long column filled with adsorbent and subjected to 2.0 ppm CO in synthetic air (79% $N_2$/21% $O_2$) at 27° C. and 7.9 bar, flowing at a rate of approximately 21 slpm (78.7 mol/m²s).

The amount of $H_2$ in the feed for each test is given in Table II along with the results of the breakthrough tests. The breakthrough time ($t_b$) and the working capacity ($X_{CO}$) were determined at a CO breakthrough concentration of 100 ppb.

TABLE II

| Adsorbent | % exch. | Size US mesh | $Y_{H2}$ ppm | $X_{co}$ @$y_{co}$ = 100 ppb mmol/g | $t_b$ hr | % CO removal @$y_{co}$ = 100 ppb |
|---|---|---|---|---|---|---|
| AgX | 100 | 10 × 14 | 3.0 | 0.052 | 5.4 | 98.8 |
| Ag-Mor | 89 | 1.8 mm* | 3.0 | 0.034 | 3.2 | 98.3 |
| Cu-clinoptilolite | 100 | 8 × 14 | 0.5 | 0.037 | 3.0 | 99.3 |
| Zn-clinoptilolite | 86 | 8 × 14 | 0.6 | — | <0.2 | — |
| Ag-clinoptilolite | 89 | 8 × 14 | 0.4 | — | <0.5 | — |

*extrudate diameter

AgX, Ag-mordenite and Cu-clinoptilolite all display CO working capacities in excess of 0.03 mmol/g, and consequently meet the criteria of the invention. Zn-clinoptilolite and Ag-clinoptilolite had working capacities less than 0.01 mmol/g and consequently are outside the scope of the invention.

Conservatively compared to the CO saturation capacities in Table I, the CO working capacities in Table II (including dynamic effects) for these adsorbents are more than 1000 times greater than those in Table I. Furthermore, breakthrough times are several hours for relatively short beds, i.e. the resultant CO working capacity allows the adsorbent to be easily integrated with current prepurifier cycles and with a minimum of additional adsorbent.

Cu-, Zn- and Ag-exchanged clinoptilolite show little or no removal capacity for $H_2$. Although $H_2$ breaks through almost immediately in AgX and Ag-mordenite, some modest holdup of $H_2$ is evident as can be seen from FIG. 2.

Figure 2:
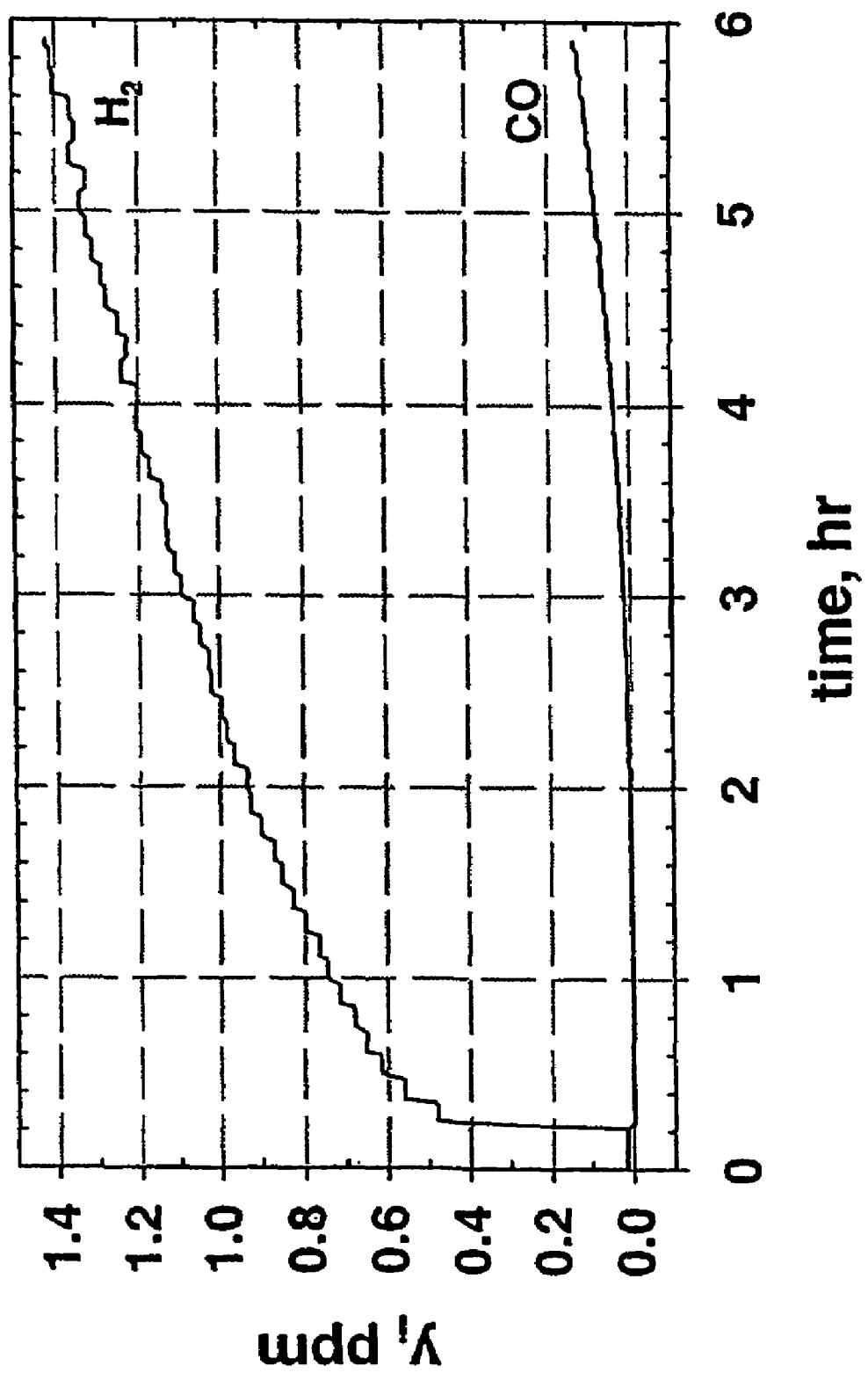
FIG. 2 is a graph of CO and $H_2$ breakthrough curves for the AgX adsorbent of Table II.

FIG. 2 gives the breakthrough history for both CO and $H_2$ using AgX (Aldrich P/N 38,228-0). Although a CO breakthrough concentration of 100 ppb was chosen for the purpose of adsorbent evaluation, one skilled in the art will appreciate that the amount of CO impurity in the product can be adjusted by selecting either a shorter adsorption step or by increasing the amount of adsorbent.

Beds were regenerated after each breakthrough test in air at 200° C. for 3.0 hr followed by a ambient temperature purge in dry $N_2$ for 3.0 hr, all at a flow of 2.2 slpm and a pressure of about 1.7 bar (25 psia). The results in FIG. 2 are for the tenth breakthrough of this bed. There was no noticeable deterioration in CO removal capacity with cycling—even in the presence of the strong $H_2$ reducing agent. Desorption was monitored after the sixth breakthrough by purging the bed with $N_2$ at 27° C. and 50° C. prior to the standard regeneration. Only CO was detected in the effluent, and more than 87% of the adsorbed CO was desorbed. The remaining CO was desorbed in the normal regeneration procedure.

$N_2$ isotherms were measured for AgX (Aldrich P/N 38,228-0) at 0° C. and 27° C. as described above. The $N_2$ capacity at 27° C. at a $N_2$ partial pressure of 6.25 bar was determined as 0.81 mmol/g. The corresponding Co partial pressure for the test stream of Table II is $1.2\times10^{-2}$ mmHg. Using Equation 3 and the results in Table II, the working separation factor $\Delta CO/\Delta N_2 = 6.4\times10^{-2}$.

The results in Table II for Cu-clinoptilolite are for the first breakthrough after activation. After regeneration following the conditions cited above, the performance was significantly degraded in the second breakthrough. The performance in Table II was restored after re-activating in $N_2$ at 350° C. It is believed that regeneration in air at elevated temperature resulted in the oxidation of $Cu^+$ to $Cu^{++}$. Reactivation in $N_2$ returned the Cu to the lower oxidation state $Cu^+$. Thus, this adsorbent may be more effectively applied in an alternative embodiment of the invention which applies the inventive concept to post-purification of cryogenically separated $N_2$ where little or no $O_2$ is present.

EXAMPLE 3

Samples of commercially available AgX (Ag400B3), Ag-mordenite (Ag900E16) and AgY (Ag600E16) were obtained from C*CHEM, A Division of Molecular Products, Inc., Lafayette, Colo. AgX was also prepared by exchanging 13X HP zeolite with Ag to various Ag-exchange levels (designated AgX (HP)). AgA was prepared by exchanging 4A zeolite with Ag. These materials and the corresponding Ag exchange levels are given in Table III along with the breakthrough time and CO working capacity.

TABLE III

| Adsorbent | Ag-exch. % | Size US Mesh | $X_{co}$ @$y_{co}$ = 100 ppb mmol/g | $t_b$ hr | % CO removal |
|---|---|---|---|---|---|
| AgX (Ag400B3) | 100 | 10 × 18 | 0.051 | 5.5 | 99.0 |
| AgX (HP) | 95 | 10 × 18 | 0.13 | 13.3 | 99.1 |
| AgA | 94 | 8 × 12 | 0.019 | 2.2 | 98.4 |
| Ag-Mor | 40 | 2.0 mm* | 0.0096 | 0.85 | 97.9 |
| AgY | 61 | 1.7 mm* | 0.018 | 1.4 | 98.8 |

*extrudate diameter

Breakthrough tests were performed at the same conditions as those of Example 2, except that 3.0 ppm $H_2$ was present in the feed for all tests. The results of Table III are for the first breakthrough after activation. The AgX (Ag400B3) performance agrees well with that of AgX in Table II. Although the AgX (HP) appears to have a significantly improved CO working capacity over the commercial AgX, much of this advantage was lost after several breakthrough/regeneration cycles.

After the fourth cycle, the breakthrough time for AgX (HP) was reduced to 7.3 hr and the CO working capacity fell to 0.073 mmol/g. The amount of degradation, however, was rapidly decreasing and a final working capacity greater than that of AgX (Ag400B3) was projected. Such improvement may be the result of either the base zeolite starting material (13XHP), macropore geometry of the exchanged zeolite and/or differences in the final state and/or location of the silver cation in the zeolite.

Different Ag-exchange levels varying from 10% to 100% were prepared using the 13XHP base material. CO working capacity was found to be approximately linearly proportional to Ag-exchange level. Thus, higher Ag-exchange level is preferred for the adsorption of CO, with 100% exchange being most preferred.

The commercial AgY and Ag-mordenite adsorbents performed much better than conventional zeolites in CO adsorption, but were less effective than AgX. The significantly different CO working capacity for the Ag-mordenites in Tables II and III are consistent with the higher Ag-exchange level of the laboratory prepared Ag-mordenite in Table II, with the lower level of exchanged material (in Table III) having a $\Delta$CO working capacity of <0.01 mmol/g, and therefore being outside the scope of the invention.

EXAMPLE 4

In this example, a bed is constructed from a 7.6 cm layer of the AgX of Example 2 followed by a 15.2 cm layer of palladium supported on porous alumina ($Pd/Al_2O_3$) oxidation catalyst typical of the prior art. A second bed was constructed of the same overall length (22.9 cm) using only the $Pd/Al_2O_3$ oxidation catalyst. The oxidation catalyst (E221, 0.5 wt % Pd supported on the surface of activated alumina beads) was obtained from Degussa Corporation. Breakthrough tests were performed at the same conditions as those in Example 3. The results are compared in Table IV. Breakthrough time of $H_2$ were recorded at 1 ppb, 5 ppb and 20 ppb.

TABLE IV

| Bed | tb ($H_2$) hr | | | $t_b$ (CO) hr | $t_b$ ($CO_2$) hr | $X_{H2}$ mmol/g @ |
| --- | --- | --- | --- | --- | --- | --- |
| | $y_{H2}$ = 1 ppb | $y_{H2}$ = 5 ppb | $y_{H2}$ = 20 ppb | | | $y_{H2}$ = 20 ppb |
| 7.6 cm AgX + 15.2 cm 0.5% $PdAl_2O_3$ | 21.3 | 23.2 | 26.5 | >30.7 | 17.3 | 0.218 |
| 22.9 cm 0.5% $PdAl_2O_3$ | 3.9 | 4.9 | 13.0 | >21.5 | 3.0 | 0.072 |

Surprisingly, replacing one third of the catalyst bed with AgX for adsorption of CO resulted in $H_2$ breakthrough times of two to five times greater than for the catalyst used alone. The effective capacity of the catalyst at 20 ppb $H_2$ breakthrough was more than tripled when CO was removed prior to $H_2$ oxidation. There was essentially no breakthrough of CO in either bed over the duration of the test, i.e. 30.7 hours (hr) for the layered bed and 21.5 hr for the catalyst only bed. Finally, the $CO_2$ breakthrough time (at $y_{CO2}$=100 ppb) was more than five times greater when CO was adsorbed in AgX. As is evident from the information above, the use of AgX to replace part of the $CO/H_2$ oxidation catalyst results in unexpected advantages in purifying the stream of CO and $H_2$ while minimizing $CO_2$ as an oxidation by-product.

Based upon the examples above, a preferred CO adsorbent for the practice of the invention has a $\Delta$CO working capacity $\geqq$0.01 mmol/g, preferably $\geqq$0.03 mmol/g. In a more preferred embodiment, the CO adsorbent has a $\Delta CO/\Delta N_2$ separation factor $\alpha$, as given by Equation 3, equal to or greater than $1\times10^{-3}$, preferably greater than $1\times10^{-2}$. In the case of small pore zeolites (e.g. natural zeolites clinoptilolite, chabazite, etc.), the pore opening or kinetic diameter of the zeolite "window" must be larger than the kinetic diameter of the CO molecule (0.376 nm). Zeolites exchanged with Group IB cations (Cu, Ag, Au (gold)) attaining an oxidation state +1 are preferred adsorbents for CO for the application of the invention. Ag-exchanged zeolites (>50% exchange) are preferred and highly exchanged AgX (>85% exchange) are most preferred. While not disclosed above in the examples, gold is believed to be useful in the practice of the invention given its similarity in chemical structure to Cu and Ag. Since the Group IB metals acting as charge balancing cations in exchanged zeolites provide enhanced CO adsorption capacity, zeolites requiring a higher number of charge balancing cations are preferred in the practice of the invention. Such zeolites are characterized by a $SiO_2/Al_2O_3$ ratio of <20.

Using the method of this invention, a TSA adsorber and system can be designed for the reduction of the concentrations of CO and, optionally one or more $H_2O$, $CO_2$, and $H_2$ from an incoming feed stream to levels of 100 ppb or less, or even 5 ppb or less in the effluent or product gas. Preferably the vessel is used in a TSA prepurifier for an air feed stream. One such vessel design is described below with reference to FIG. 3. The arrow (see also in FIGS. 4-6) indicates the direction of gas flow through the adsorber bed/vessel. A TSA prepurifier system incorporating such a vessel is disclosed below with reference to FIG. 7.

Returning to FIG. 3, vessel 30 is shown. Vessel 30 contains a first layer of $H_2O$ adsorbent (31) such as alumina, silica gel or molecular sieve or mixture of these to remove substantially all of $H_2O$ entering the vessel. A second layer (32) of $CO_2$ adsorbent such as 13X (NaX) or 5A or mixture of these is used to remove substantially all of $CO_2$. The $CO_2$ adsorbent layer can also remove any residual water remaining from the $H_2O$ adsorbent layer. A third layer (33) of CO adsorbent is placed downstream of the $CO_2$ adsorbent. (By the term "downstream" we mean closer to the effluent or product end of the adsorber vessel.)

A substantially $H_2O$-free and $CO_2$-free gas stream enters this CO adsorbent layer. The CO adsorbent layer can be designed to remove more than 50%, preferably more than 95% of the CO in the feed, thus producing a product gas containing <100 ppb CO and most preferably removing more than 99.8% of the CO in the feed, thus producing a product gas stream containing <5 ppb CO. A feed stream, which is substantially free of $H_2O$, $CO_2$ and CO, enters the catalyst layer 34. This catalyst removes $H_2$ and any remaining small amounts of CO using a combination of adsorption and/or absorption and oxidation. One or more optional adsorbent layers 35 may be placed downstream of the CO adsorbent and catalyst layer to remove any $CO_2$ and $H_2O$ oxidation products formed but not adsorbed in the catalyst. The optional layer(s) may also be selected to remove hydrocarbons, $N_2O$ and/or other trace contaminants.

Figure 4:
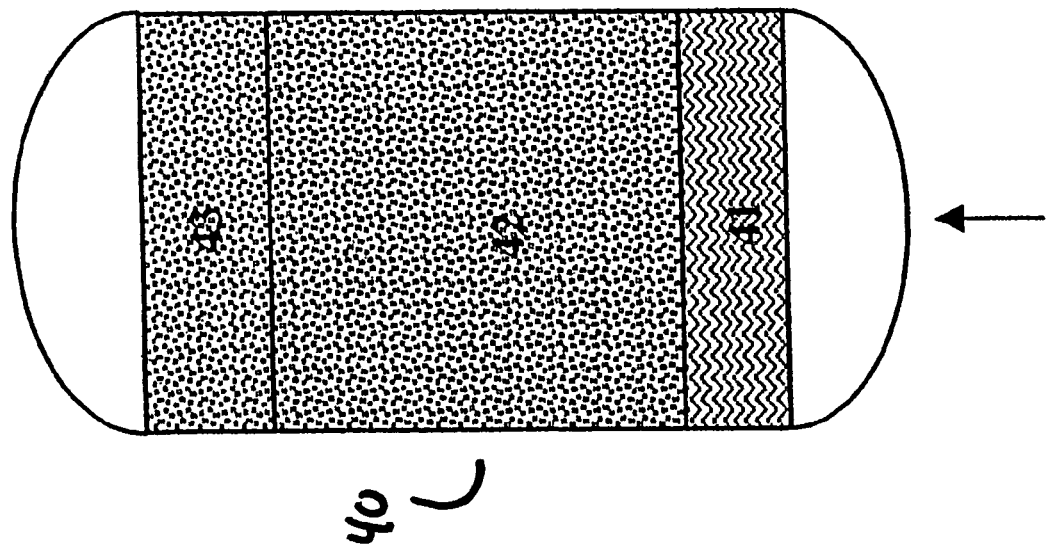
FIGS. 3-6 are schematic diagrams of preferred adsorbent arrangements in an adsorbent vessel/bed.
Figure 5:
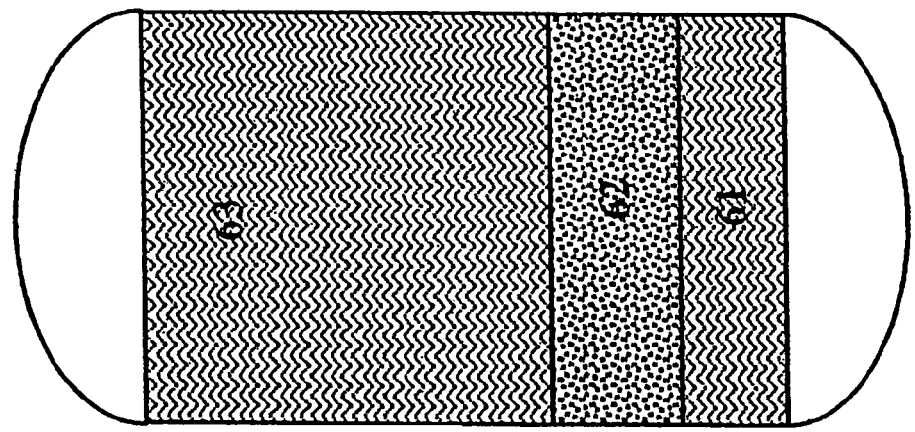
Figure 6:
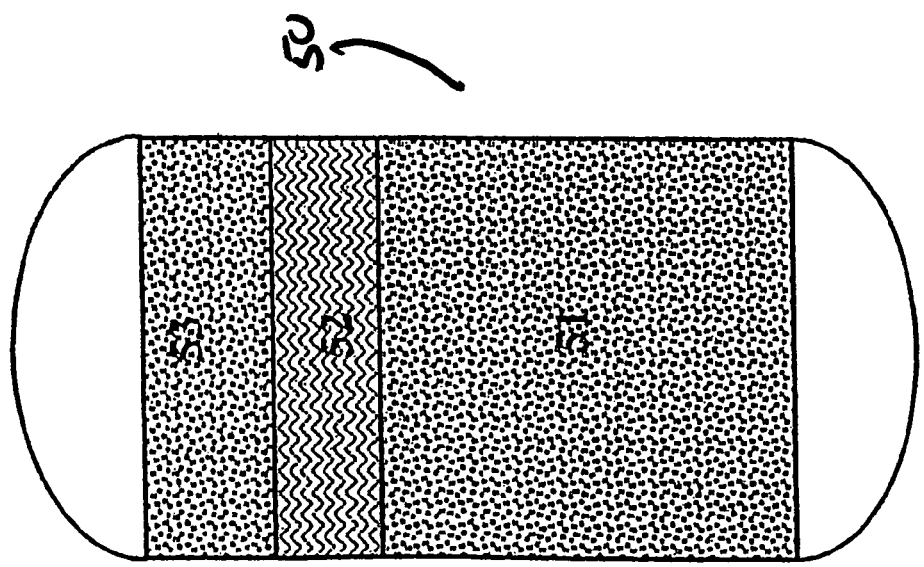

FIGS. 4-6 show alternative embodiments for integrating a CO adsorbent layer into an adsorber vessel for use in gas separations such as prepurification. Of course combinations of these embodiments are within the scope of the invention.

The required adsorbent and catalyst layer thickness vary according to the process conditions of experienced by the adsorber during the separation process. These can vary widely from one system/process to another. The depth of the layers depicted in FIGS. 3-6 are not intended to imply or suggest any particular or relative amounts of adsorbent and/or catalyst. The most important process conditions are molar flux of air, cycle time, feed temperature and pressure and gas composition. A person ordinarily skilled in designing a prepurifier should, for example, be able to design the adsorbent and catalyst layers for each prepurifier according to the adsorbent/catalyst properties and the prepurifier process conditions. These methods are illustrated in detail in various textbooks such as Ruthven (*Principles of Adsorption and Adsorption Processes,* 1984).

Figure 3:
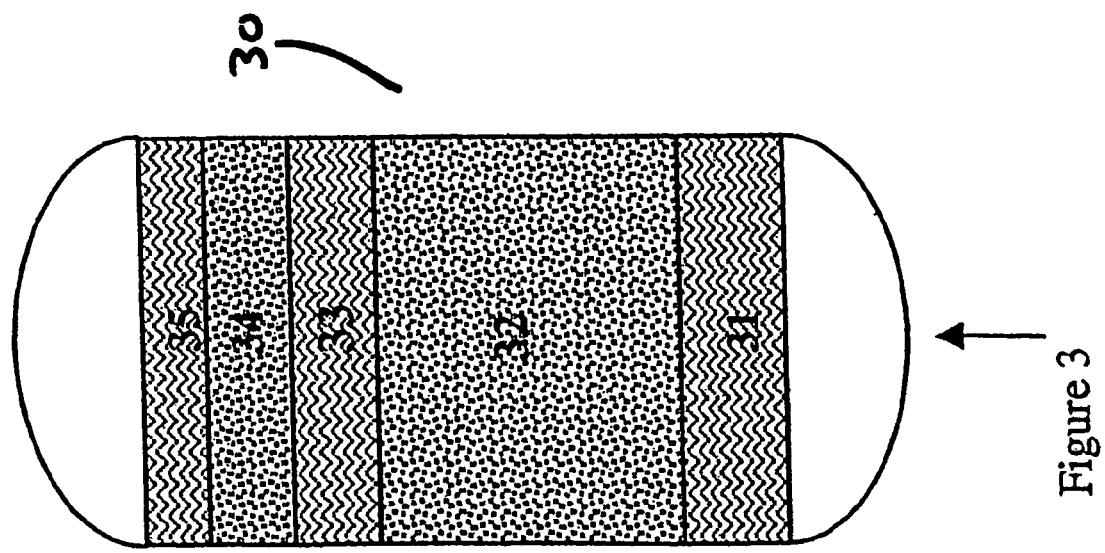

While FIG. 3 has been described above, FIGS. 4-6 will now be described below.

With reference to FIG. 4, an embodiment is contemplated using vessel 40 for the removal of $H_2O$ (in layer 41), $CO_2$ (in layer 42) and CO (in layer 43). In this embodiment a catalyst layer for $H_2$ removal is not required.

With reference to FIG. 5, a vessel 50 is shown wherein the $H_2O$ and $CO_2$ adsorbents are combined in a single layer 51 either as a single adsorbent, a mixture of different adsorbents or through the use of composite adsorbents, followed by a CO adsorbent layer 52 and catalyst layer 53 for $H_2$ removal. A further adsorbent layer (similar in function to layer 35 illustrated in FIG. 3) for clean-up and/or removal of other components (e.g. hydrocarbons) as with layer 35) may also be used, but is not shown.

With reference to FIG. 6, vessel 60 contains a CO adsorbent layer 62 placed prior to the $CO_2$ adsorbent layer 63, with both being downstream of $H_2O$ adsorbent layer 61. If removal of $H_2$ is required an additional catalyst layer (not shown) may be used after the CO layer. Additional layers for clean-up and removal of other components (e.g. hydrocarbons) may be added.

The catalyst used for the removal of $H_2$ and remaining CO is a supported metal catalyst. One or more of the metals Os, Ir, Pt, Ru, Rh, Pd, Fe, Co, Ni, Cu, Ag, Au, Zn, Sn, Mn, Cr, Pb, Ce may be deposited on a support chosen from alumina, silica, natural or synthetic zeolites, titanium dioxide, magnesium oxide or calcium oxide. At least one of these metals is deposited on the support by techniques well known in the art. The most preferred catalyst for this invention is Pt and/or Pd supported on alumina.

The optional adsorbent layer described above may be at least one of alumina, silica gel or zeolite. A zeolite layer is preferred. Most preferably, 13X (with 13X APG, available from UOP, Des Plaines, Ill. USA being most preferred) is used in this layer when $CO_2$ and $H_2O$ oxidation products are to be removed. This optional $H_2O$ and $CO_2$ removal layer can either be placed downstream of the catalyst layer or can be physically mixed with the catalyst layer. The adsorbent selected for the optional layer depends upon the contaminants to be removed, e.g. clinoptilolite for removal of trace $N_2O$ and $CO_2$ as described in copending commonly assigned patent application PCT Serial No. 02/40591 "Method for Removal of $N_2O$ from Gaseous Streams"; and/or NaY, alumina or SELEXORB (a composite of NaY/alumina available from ALCOA, USA) for the removal of hydrocarbons.

The invention offers the advantage that existing prepurifiers can be easily retrofitted by placing the CO adsorbent and optional catalyst at the downstream end of the prepurifier. The invention may also be applied to create "high purity" product when ultra high purity product is not required, i.e. when the standard purity of existing air separation plants is not sufficient, but electronics grade UHP is not necessary. In such applications, any of the embodiments, processes and configurations of the invention may be used to purify a feed mixture and remove CO and/or $H_2$ contaminants to <100 ppb, individually.

The process is carried out preferably in a cyclic process such as pressure swing adsorption (PSA), temperature swing adsorption (TSA), vacuum swing adsorption (VSA) or a combination of these. The process of the invention may be carried out in single or multiple adsorption vessels operating in a cyclic process that includes at least the steps of adsorption and regeneration. The adsorption step is carried out at pressure range of 1.0 to 25 bar and preferentially from about 3 to 15 bar. The temperature range during the adsorption step is −70° C. to 80° C. When a PSA process is used, the pressure during the regeneration step is in the range of about 0.20 to 5.0 bar, and preferably 1.0 to 2.0 bar. For a TSA process, regeneration is carried out at a temperature usually in the range of about 50° C. to 400° C., preferably between 100° C. to 300° C.

Figure 7:
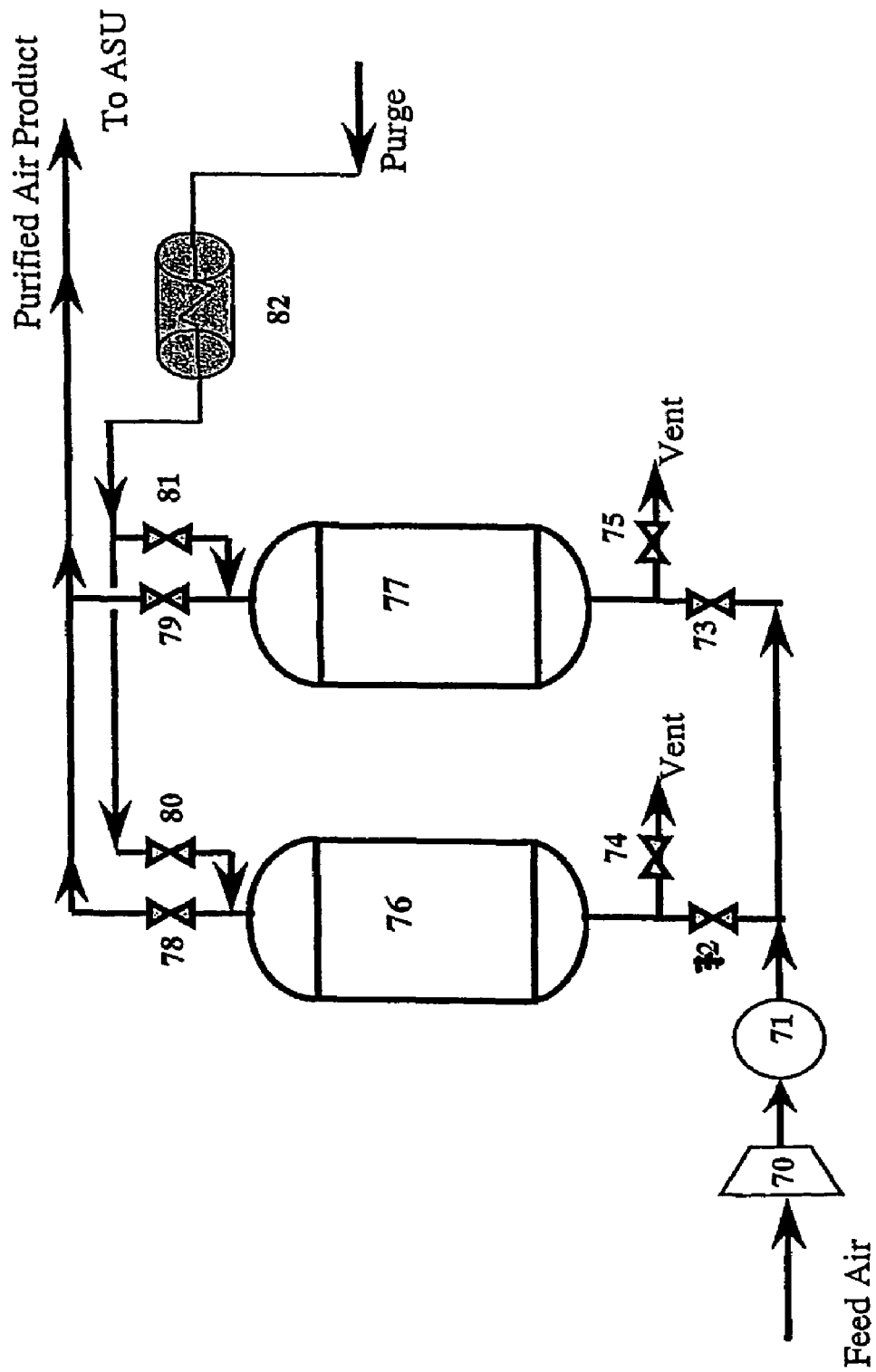
FIG. 7 is a schematic diagram of a prepurification apparatus useful for carrying out the invention.

One possible process is described herein with reference to FIG. 7. Feed air is compressed in compressor 70 and cooled by chilling means 71 prior to entering one of two adsorbers (76 and 77) where at least the contaminants $H_2O$, $CO_2$ and CO are removed from the air. The adsorbers 76 and 77 each have the same adsorbent bed configuration, which may, for example be one as described with reference to FIGS. 3-6 above. The purified air exits the adsorber and then enters the air separation unit (ASU) where it is then cryogenically separated into its major components $N_2$ and $O_2$. In special designs of the ASU, Ar, Kr and Xe may also be separated and recovered from the air. While one of the beds is adsorbing the contaminants from air, the other is being regenerated using purge gas. A dry, contaminant-free purge gas may be supplied from the product or waste stream from the ASU or from an independent source to desorb the adsorbed contaminants and thereby regenerate the adsorber and prepare it for the next adsorption step in the cycle. The purge gas may be $N_2$, $O_2$, a mixture of $N_2$ and $O_2$, air or any dry inert gas. In the case of thermal swing adsorption (TSA), the purge gas is first heated in heater 82 prior to being passed through the adsorber in a direction countercurrent to that of the feed flow in the adsorption step. TSA cycles may also include a pressure swing. When only pressure swing adsorption (PSA) is utilized, there is no heater.

The operation of a typical TSA cycle is now described in reference to FIG. 7 for one adsorber 76. One skilled in the art will appreciate that the other adsorber vessel 77 will operate with the same cycle, only out of phase with the first adsorber in such a manner that purified air is continuously available to the ASU. This operation of this out of phase cycle is indicated with reference to the numbers in parentheses.

Feed air is introduced to compressor 70 where it is pressurized. The heat of compression is removed in chilling means 71, e.g. a mechanical chiller or a combination of direct contact after-cooler and evaporative cooler. The pressurized, cool and $H_2O$-saturated feed stream then enters adsorber 76 (77). Valve 72 (73) is open and valves 74 (75), 78 (79) and 80 (81) are closed as the adsorber vessel 76 (77) is pressurized. Once the adsorption pressure is reached, valve 78 (79) opens and purified product is directed to an ASU for cryogenic air separation. When the adsorber 76 (77) has completed the adsorption step, valves 78 (79) and 72 (73) are closed and valve 74 (75) is opened to blow down the adsorber 76 (77) to a lower pressure, typically near ambient pressure. Once depressurized, valve 80 (81) is opened and heated purge gas is introduced into the product end of the adsorber 76 (77). At some time during the purge cycle, the heater is turned off so that the purge gas cools the adsorber to near the feed temperature.

One of ordinary skill in the art will further appreciate that the above description represents only an example of a typical prepurifier cycle, and there are many variations of such a typical cycle that may be used with the present invention. For example, PSA may be used alone wherein both the heater 82 and the chilling means 71 may be removed. Pressurization may be accomplished with product gas, feed gas or a combination of the two. Bed-to-bed equalization may also be used and a blend step may be incorporated where a freshly regenerated bed is brought on line in the adsorption step with another adsorber nearing completion of its adsorption step. Such a blend step serves to smooth out pressure disturbances due to bed switching and also to minimize any thermal disturbances caused when the regenerated bed is not completely cooled to the feed temperature. Furthermore, the invention may be practiced with a prepurifier cycle not limited to two adsorber beds. The method of the invention can be applied in horizontal, vertical or radial flow vessels.

The method of regeneration depends upon the type of cyclic process. For a TSA process, regeneration of the adsorbent bed is achieved by passing heated gas countercurrently through the bed. Using the thermal pulse method, a cooling purge step follows the hot purge step. The heated regeneration gas may also be provided at a reduced pressure (relative to the feed) so that a combined TSA/PSA process is affected. This reduced pressure may be above or below ambient pressure. In cryogenic air separation processes, the regeneration gas is typically taken from the product or waste $N_2$ or $O_2$ streams.

In some cases, passing an inert or weakly adsorbed purge gas countercurrently through the bed can further clean the adsorbent bed. In a PSA process, the purge step usually follows the countercurrent depressurization step. In case of a single vessel system, the purge gas can be introduced from a storage vessel, while for multiple bed system, purge gas can be obtained from another adsorber that is in the adsorption phase.

The adsorption system can have more steps than the two basic fundamental steps of adsorption and desorption. For example, top to top equalization or bottom to bottom equalization can be used to conserve energy and increase recovery.

In a preferred embodiment of the invention, as applied to air prepurification, essentially all of water vapor and substantially all of the $CO_2$ are removed from air on at least one layer of activated alumina or zeolite, or by multiple layers of activated alumina and zeolite prior to passing the air stream through the CO adsorbent layer. Optionally, the CO selective adsorbent layer may be extended and used to remove part or all of the $CO_2$ from air.

Alternately, in an adsorption vessel, a first layer of adsorbent can be used to remove water vapor and a next layer comprised of a mixture of the CO selective adsorbent and 13X (or other zeolite) can be used to remove both $CO_2$ and CO from the air. Such an adsorbent mixture may be composed of physically separate adsorbents or of different adsorbents bound together in the form of a composite.

In applications requiring only a small amount of CO adsorbent (e.g. low CO concentrations in the feed, etc.), it may be advantageous to mix the CO adsorbent with another adsorbent (such as 13X) in order to affect a thicker layer of mixed adsorbent rather than a very thin layer of the CO adsorbent alone. The advantage of the thicker mixed layer being ease of installation and less critical tolerance on the overall layer thickness.

The method of the invention can be used to remove one or both of CO and $H_2$ from air, $N_2$ and other weakly adsorbing bulk gases. Weaker adsorbing gases to be purified of CO can be identified initially from the electronic properties of such gases. Using the criteria of $CO/N_2$ selectivity and CO working capacity defined above for selecting an appropriate adsorbent insures that the system will work as well or better in removing CO from more weakly adsorbed gases such as $N_2$, helium (He), neon (Ne), $H_2$, xenon (Xe), krypton (Kr), argon (Ar), $O_2$ and methane ($CH_4$) and others with similar properties.

Further, while a preferred application of the invention is in prepurification prior to cryogenic air separation, the invention as described herein may also be applied to remove CO and/or hydrogen present in nitrogen gas after cryogenic distillation.

The size of $H_2O$ and $CO_2$ removal layers upstream (by the term "upstream" we mean being located closer to the feed end of the adsorber vessel) of CO adsorbent would depend upon the $H_2O$ and $CO_2$ concentration in the gas to be purified. Inert gases such as $N_2$ may contain ppm levels of $O_2$, if they contain any oxygen at all. Therefore the mechanism for CO and $H_2$ removal in the CO adsorbent and the catalyst would be a combination of adsorption/chemisorption and absorption. For the removal of CO only by adsorption, an optional cleanup layer may be eliminated as shown in FIG. 4 described above. In the absence of oxygen, the oxidation products $CO_2$ and $H_2O$ would not form, therefore an optional clean up layer as shown in FIG. 3 may not be needed. The method of this invention can also be used for post purification of $N_2$ in the cryogenic plants.

As indicated above, the adsorbent beds/vessels used in the method of the invention can have variety of configurations such as vertical flow beds, horizontal flow beds or radial flow beds and can be operated in a pressure swing adsorption mode, temperature swing adsorption mode, vacuum swing adsorption mode or a combination of these.

The adsorbents in this method may be shaped by a series of methods into various geometrical forms such as beads, granules and extrudates. This might involve addition of a binder to zeolite powder in ways well known to those skilled in the art. These binders might also be necessary for tailoring the strength of the adsorbents. Binder types and shaping procedures are well known and the current invention does not put any constraints on the type and percentage amount of binders in the adsorbents.

The CO adsorbent could also potentially adsorb some hydrocarbons and nitrogen oxides from air. To ensure complete removal of hydrocarbons, the CO adsorbent can be physically mixed with a hydrocarbon selective adsorbent.

The method suggested in this invention can be used for cleanup of any gas containing contaminant levels of CO alone or in combination with $H_2$, H2O, CO2, hydrocarbons and $N_2O$.

The term "comprising" is used herein as meaning "including but not limited to", that is, as specifying the presence of stated features, integers, steps or components as referred to in the claims, but not precluding the presence or addition of one or more other features, integers, steps, components, or groups thereof.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. An adsorption apparatus for the removal of CO from a feed stream containing CO in an amount of less than 50 ppm, said apparatus comprising at least one adsorption vessel containing a CO adsorbent layer, the CO adsorbent having a ΔCO working capacity greater than or equal to 0.01 mmol/g, and a source which supplies said feed stream, wherein
- a) when said feed stream further contains at least one gas selected from the group consisting of nitrogen, He, Ne, Ar, Xe, Kr, $CH_4$ and mixtures thereof, said adsorbent is ion exchanged with a Group IB element; or
- b) when said feed stream further contains at least one gas selected from the group consisting of oxygen and air and mixtures thereof, said adsorbent is a zeolite having a $SiO_2/Al_2O_3$ ratio of <20, and is ion-exchanged with a $Ag^+$ or $Au^+$.

2. The apparatus of claim 1, wherein said apparatus contains two or more of said adsorption vessels.

3. The apparatus of claim 1, wherein said adsorption vessel is selected from the group consisting of vertical flow vessels, horizontal flow vessels, lateral flow vessels or radial flow vessels.

4. The adsorption apparatus of claim 1, wherein said apparatus further contains an adsorbent selective for the adsorption of water, and wherein the water selective adsorbent layer is upstream of said CO adsorbent layer.

5. The adsorption apparatus of claim 1, wherein said apparatus further contains a catalyst layer for the catalytic oxidation of $H_2$ to $H_2O$, and wherein said catalyst layer is downstream of said CO adsorbent layer.

6. The adsorption apparatus of claim 5, wherein said apparatus further contains an auxiliary adsorbent for the removal of water, and wherein said auxiliary adsorbent is downstream of said catalyst layer.

7. The apparatus of claim 1, wherein said $\Delta CO$ working capacity is greater than or equal to 0.03 mmol/g.

8. The apparatus of claim 4, wherein the water selective adsorbent is one or more of alumina or NaX zeolite.

9. The apparatus of claim 5, wherein the $H_2$ catalyst is a supported metal catalyst.

10. The apparatus of claim 9, wherein said supported metal catalyst comprises one or more of the metals Os, Ir, Pt, Ru, Rh, Pd, Fe, Co, Ni, Cu, Ag, Au, Zn, Sn, Mn, Cr, Pb, Ce and is supported on a substrate selected from the group consisting of alumina, silica, natural or synthetic zeolites, titanium dioxide, magnesium oxide and calcium oxide.

11. The apparatus of claim 1, wherein said apparatus further contains:
- a) at least one adsorbent layer upstream of said CO adsorbent for the adsorption of one or more of $H_2O$ and $CO_2$;
- b) a catalyst layer for the catalytic conversion of $H_2$ to $H_2O$ that is downstream of said CO adsorbent layer; and
- c) one or more additional adsorbents for the adsorption of one or more of $H_2O$, $CO_2$, $N_2O$ and hydrocarbons, wherein said additional adsorbents are downstream of said catalyst layer.

12. The apparatus of claim 11, wherein said one or more additional adsorbents are selected from the group consisting of alumina, silica gel, clinoptilolite, zeolites, composites thereof and mixtures thereof.

13. The apparatus of claim 1, wherein the CO adsorbent has a $\Delta CO/\Delta N_2$ separation factor of greater than or equal to $1\times 10^{-3}$.

14. The apparatus of claim 1, wherein when said feed stream further contains at least one gas selected from the group consisting of nitrogen, He, Ne, Ar, Xe, Kr, $H_2$, $CH_4$ and mixtures thereof, said CO adsorbent is selected from the group consisting of AgX zeolite, Ag-Mordenite, Cu-clinoptilolite, AgA zeolite and AgY zeolite.

15. The apparatus of claim 1, wherein when said feed stream further contains at least one gas selected from the group consisting of oxygen and air and mixtures thereof, said CO adsorbent is selected from the group consisting of AgX zeolite, Ag-Mordenite, AgA zeolite and AgY zeolite.

16. The apparatus of claim 1, wherein said CO adsorbent is AgX zeolite.

17. The apparatus of claims 1, wherein when said feed gas further contains air, said apparatus is an air prepurifier.

18. The apparatus of claim 1, wherein said CO adsorbent is AgX having 100% of its cations associated with Ag.

19. A process for the removal of CO from a feed stream containing CO in an amount of less than 50 ppm, said process comprising contacting said feed stream with a CO adsorbent having a $\Delta CO$ working capacity greater than or equal to 0.01 mmol/g to produce a CO depleted gas stream; and wherein
- a) when said feed stream further contains at least one gas selected from the group consisting of nitrogen, He, Ne, Ar, Xe, Kr, $H_2$, $CH_4$ and mixtures thereof, said adsorbent is a zeolite exchanged with a Group IB element; or
- b) when said feed stream further contains at least one gas selected from the group consisting of oxygen and air and mixtures thereof, said adsorbent is a zeolite having a $SiO_2/Al_2O_3$ ratio of <20, and is ion-exchanged with a $Ag^+$ or $Au^+$.

20. The process of claim 19, further comprising recovering said CO depleted gas stream, wherein CO is present in said CO depleted gas stream at a concentration of less than 100 ppb.

21. The process of claim 19, further comprising recovering said CO depleted gas stream, wherein CO is present in said CO depleted gas stream at a concentration of less than 5 ppb.

22. The process of claim 19, wherein said CO concentration in said feed stream is less than 1 ppm CO.

23. The process of claim 19, wherein said CO concentration in said feed stream is less than 0.5 ppm CO.

24. The process of claim 19, wherein said feed gas further comprises water ($H_2O$), and said process further comprises contacting said feed stream with a water selective adsorbent that is located upstream of said CO adsorbent.

25. The process of claim 19, wherein said feed gas further comprises hydrogen, and said process further comprises contacting said CO depleted feed stream with a catalyst layer for the catalytic oxidation of $H_2$ to $H_2O$ to produce a $H_2$ depleted and $H_2O$ enriched gas, and wherein said catalyst layer is located downstream of said CO adsorbent layer.

26. The process of claim 25, wherein said process further comprises the step of contacting said $H_2O$ enriched gas with an adsorbent for the removal of water, and wherein the $H_2O$ adsorbent layer is located downstream of said catalyst layer to produce a gas that is depleted in CO, $H_2$ and $H_2O$.

27. The process of claim 19, wherein said $\Delta CO$ working capacity is greater than or equal to 0.03 mmol/g.

28. The process of claim 19, wherein the CO adsorbent has a $\Delta CO/\Delta N_2$ separation factor that is greater than or equal to $1\times 10^{-3}$.

29. The process of claim 19, wherein the CO adsorbent has a $\Delta CO/\Delta N_2$ separation factor that is greater than or equal to $1\times 10^{-2}$.

30. The process of claim 24, wherein the water selective adsorbent is one or more of alumina or NaX.

31. The process of claim 25, wherein the catalyst is a supported metal catalyst.

32. The process of claim 31, wherein said supported metal catalyst is comprises one or more of the metals Os, Ir, Pt, Ru, Rh, Pd, Fe, Co, Ni, Cu, Ag, Au, Zn, Sn, Mn, Cr, Pb, Ce and is supported on a substrate selected from the group consisting of alumina, silica, natural or synthetic zeolites, titanium dioxide, magnesium oxide and calcium oxide.

33. The process of claim 19, wherein said process further comprises passing said feed gas over:
a) at least one adsorbent layer upstream of said CO adsorbent for the adsorption of one or more of $H_2O$ and $CO_2$,
b) a catalyst layer for the catalytic conversion of $H_2$ to $H_2O$ that is downstream of said CO adsorbent layer; and
c) one or more additional adsorbents for the adsorption of one or more of $H_2O$, $CO_2$, $N_2O$ and hydrocarbons, wherein said additional adsorbents are downstream of said catalyst layer.

34. The process of claim 33, wherein said one or more additional adsorbents are selected from the group consisting of alumina, silica gel, clinoptilolite, zeolites, composites thereof and mixtures thereof.

35. The process of claim 19, wherein said process is selected from the group consisting of pressure swing adsorption, temperature swing adsorption, or a combination thereof.

36. The process of claim 19, wherein said process takes place in an adsorber vessel selected from a vertical flow vessel, a horizontal flow vessel or a radial flow vessel.

37. The process of claim 25, wherein the hydrogen depleted gas contains less than 100 ppb hydrogen.

38. The process of claim 25, wherein the hydrogen depleted gas contains less than 5 ppb hydrogen.

39. The process of claim 19, wherein the adsorption step of said process is operated at a temperature of zero to fifty degrees Celsius.

40. The process of claim 19, wherein when said feed gas further contains at least one gas selected from the group consisting of nitrogen, He, Ne, Ar, Xe, Kr, $H_2$, $CH_4$ and mixtures thereof said CO adsorbent is selected from the group consisting of AgX, Ag-Mor, Cu-clinoptilolite, AgA zeolite and AgY zeolite.

41. The process of claim 19, wherein when said feed gas further contains at least one gas selected from the group consisting of air and oxygen and mixtures thereof said CO adsorbent is selected from the group consisting of AgX, Ag-Mor, AgA zeolite and AgY zeolite.

42. The process of claim 19, wherein said CO adsorbent is AgX having greater than 50% of its cations associated with Ag.

43. The process of claim 19, wherein said CO adsorbent is AgX having 100% of its cations associated with Ag.

44. The process of claim 19, wherein said feed stream contains air, and wherein said CO depleted gas stream is passed to a cryogenic distillation column.

45. The process of claim 19, further comprising recovering said CO depleted gas stream, wherein CO is present in said CO depleted gas stream at a concentration of less than 1 ppb.

46. The process of claim 19, wherein the CO partial pressure in said feed stream is less than 0.1 mmHg.

47. The process of claim 19, wherein the CO partial pressure in said feed stream is less than 0.005 mmHg.

48. A process for the removal of CO from a feed stream containing CO in an amount of less than 50 ppm and hydrogen said process comprising contacting said feed stream with a CO adsorbent having a $\Delta$CO working capacity greater than or equal to 0.01 mmol/g to produce a CO depleted gas stream; and wherein said adsorbent is a zeolite exchanged with a Group IB element.

49. An adsorption apparatus for the removal of CO from a feed stream containing CO in an amount of less than 50 ppm, and hydrogen, said apparatus comprising at least one adsorption vessel containing a CO adsorbent layer, the CO adsorbent having a $\Delta$CO working capacity greater than or equal to 0.01 mmol/g; and wherein said adsorbent is a zeolite exchanged with a Group IB element, and a source which supplies said feed stream.

50. An air prepurification adsorption apparatus for the removal of CO from an air feed stream containing CO in an amount of less than 50 ppm, said apparatus comprising at least one adsorption vessel containing a CO adsorbent layer, the CO adsorbent having a $\Delta$CO working capacity greater than or equal to 0.01 mmol/g, and a source which supplies said feed stream, and
wherein said adsorbent is a zeolite having a $SiO_2/Al_2O_3$ ratio of <20, and is ion-exchanged with a $Ag^+$ or $Au^+$.

51. The apparatus of claim 50, wherein said apparatus further comprises at least one adsorbent layer upstream of said CO adsorbent for the adsorption of one or more of $H_2O$ and $CO_2$.

52. The apparatus of claim 49 or claim 50, further comprising a catalyst layer for the catalytic conversion of $H_2$ to $H_2O$ that is downstream of said CO adsorbent layer; and one or more additional adsorbents for the adsorption of one or more of $H_2O$, $CO_2$, $N_2O$ and hydrocarbons, wherein said additional adsorbents are downstream of said catalyst layer.

53. The apparatus of claim 49 or claim 50, wherein said CO adsorbent is AgX.

54. A process for the removal of CO from a feed stream containing CO in an amount of less than 50 ppm and air said process comprising contacting said feed stream in an adsorber vessel with a CO adsorbent having a $\Delta$CO working capacity greater than or equal to 0.01 mmol/g to produce a CO depleted gas stream; and
wherein_said adsorbent is a zeolite having a $SiO_2/Al_2O_3$ ratio of <20, and is ion-exchanged with a $Ag^+$ or $Au^+$.

55. The process claim 54, wherein said process further comprises passing said feed stream over at least one adsorbent layer upstream of said CO adsorbent for the adsorption of one or more of $H_2O$ and $CO_2$ to produce a $H_2O$ and or $CO_2$ depleted feed stream.

56. The process of claim 54, wherein said process further comprises, passing said feed stream over a catalyst layer that is downstream of said CO adsorbent layer for the catalytic conversion of $H_2$ to $H_2O$ layer and one or more additional adsorbents for the adsorption of one or more of $H_2O$, $CO_2$, $N_2O$ and hydrocarbons, wherein said additional adsorbents are downstream of said catalyst layer to produce a feed stream that is depleted in CO, $H_2$ and one or more of $H_2O$, $CO_2$, $N_2O$ and hydrocarbons.

57. The process of claim 54, wherein said CO adsorbent is AgX.

58. The process of claim 54, wherein the depleted feed stream is passed to a cryogenic distillation column for the separation of air.

* * * * *